United States Patent [19]

Stuhlinger

[11] Patent Number: 5,113,284
[45] Date of Patent: May 12, 1992

[54] PHASED ARRAY OPTICAL TELESCOPE

[75] Inventor: Tilman W. Stuhlinger, Tucson, Ariz.

[73] Assignee: Talandic Research Corporation, Azusa, Calif.

[21] Appl. No.: 652,173

[22] Filed: Feb. 7, 1991

[51] Int. Cl.$^5$ .................. G02B 23/00; G02B 23/02
[52] U.S. Cl. ........................ 359/419; 359/618
[58] Field of Search ............ 350/1.2, 503–505, 350/537, 538, 561, 567, 169, 171, 174, 557; 359/399, 400, 419, 423, 618, 363, 364, 365, 366; 250/201.9

[56] References Cited

U.S. PATENT DOCUMENTS

| | | | |
|---|---|---|---|
| 3,507,547 | 4/1970 | Thomas | 359/419 X |
| 4,856,884 | 8/1989 | Fender et al. | 350/557 |
| 4,953,964 | 9/1990 | Anapi et al. | 350/557 |
| 4,981,354 | 1/1991 | DeHainaut et al. | 356/141 |

OTHER PUBLICATIONS

Hege et al., "Multiple Mirror Telescope as a Phased Array Telescope", *Applied Optics*, 15 Aug. 1985, vol. 24, No. 16, pp. 2565–2576.
Stulinger, Tilman W., "All-Reflective Phased Array Telescopes", International Lens Design Conference, 11–14 Jun. 1990, *Proc. SPIE*, 1354, (pp. 438–446).
Traub, Wesley A., "Combining Beams from Separated Telescopes", *Applied Optics*, vol. 24, No. 4, Feb. 15, 1986 (pp. 528–531).
Beckers, Jacques M., "The VLT Interferometer, III. Factors Affecting Wide Filed-of -View Operations", *Proc. SPIA*, 1236, 1990 (11 pages).
Weaver et al., "Design Consideration for Multiple Telescope Imaging Arrays", submitted for publication in *Optical Engineering*, Sep. 1988, vol. 27, No. 9 (pp. 730–735).
Lampkin et al., "Optical and Mechanical Design Aspects of a Four-Telescope Array for Combined Imaging", submitted for publication in *Optical Engineering*, Sep. 1988, vol. 27, No. 9 (pp. 749–754).

*Primary Examiner*—Constantine Hannaher
*Assistant Examiner*—Edward J. Glick
*Attorney, Agent, or Firm*—Norman E. Brunell

[57] ABSTRACT

A phased array telescope in which the output field angle of each afocal subtelescope is equal to the arcsin of the product of the magnification and the sine of the input field angle. The resultant subtelescope distortion reduces piston error at the input to the beam combining telescope to increase resolution by reducing piston error otherwise caused by distortion-free subtelescopes. The phased array telescope uses only reflecting surfaces in order to operate over a wide spectral band. Optically powered primary, secondary and tertiary reflecting surfaces are combined with an aspheric folding mirror before the image that would have been formed by the secondary mirror to control the distortion of each subtelescope to exactly follow the arcsin rule provided.

14 Claims, 5 Drawing Sheets

Wrong

PHASED ARRAY OPTICAL TELESCOPE

ORIGIN OF THE INVENTION

The invention described herein was made with Government support under F29601-89-c-0037 awarded by the Air Force. The Government has certain rights in the invention.

BACKGROUND OF THE INVENTION

1. Field of the Invention

This invention relates to optical telescopes and in particular to phased array optical telescopes.

2. Description of the Prior Art

The resolution requirements of advanced astronomical and surveillance telescopes indicate effective apertures of great size, beyond the range considered feasible for conventional or monolithic telescope configurations. Two alternative configurations to monolithic telescopes are available, segmented mirror configuration telescopes and phased array telescopes.

Conventional telescopes include a series of lenses or mirrors mounted along a common optical axis to form an image of a distant object. The first lens or first mirror, called the primary mirror, in the optical path is normally the largest and usually controls the light gathering power as well as the limiting resolution of the telescope. The limiting resolution may be defined as the smallest separation between two point objects which the telescope is capable of discerning.

In such conventional telescopes, all lenses and mirrors are usually manufactured from a single block of glass. These optical components are therefore termed "monolithic". The construction of monolithic optical telescopes with diameters as large as 10 meters is not currently considered feasible due to the large mass of the monolithic components and the difficulty of polishing such large surfaces to the required accuracies.

One approach developed to provide large effective apertures without the requirement of monolithic optical components of the same size is the segmented mirror, such as the 10 meter Keck telescope currently under construction for the University of California. The Keck telescope will employ a segmented primary mirror. Electronic sensors will detect misalignments among the mirror segments which will then be used to correct or minimize such misalignments. One disadvantage of the segmented mirror approach is that many segments must be constructed which, if the overall mirror profile is non-spherical, must include complicated off-axis portions of aspheric surfaces. One advantage of the segmented mirror approach is that each light ray entering the telescope system is reflected the same number of times it would be reflected in a conventional telescope. The segmented telescope approach incurs no additional reflection losses than would occur in a comparable monolithic telescope.

Another alternative to large monolithic telescope systems is the phased array telescope configuration. Phased array telescopes include arrays of afocal subtelescopes arranged about a beam combining telescope which combines the subtelescope beams into a single image. All optical components are on-axis, and are thus easier to manufacture and test than the off-axis sequence of segmented mirror telescopes.

The afocal subtelescopes in a phased array telescope system have infinite focal lengths. They convert an incoming parallel, or collimated, bundle of rays into a collimated output bundle with a smaller diameter. The optical system design goal in a phased array telescope is to provide that the bundles of rays exiting the subtelescopes and entering the beam combining telescope act as a single, continuous wavefront. This requirement must hold true for ray bundles entering the subtelescopes over a range of input angles, or over the entire field of view.

In this manner, a continuous input wavefront is mapped by the array of subtelescopes into a continuous output wavefront having smaller overall diameters and larger field angles. The beam combining telescope then uses conventional imaging principles to form a final, global image from a combination of the output wavefronts from all subtelescopes. The optical path lengths for all paths through the subtelescopes must be the same for all points on the wavefronts over the entire field of view for the global image from the beam combining telescope to be an accurate, high resolution image of the original field of view of the group of subtelescopes.

A number of geometric and imaging preconditions are imposed upon the configuration and optical design of a conventional phased array telescope. The conditions will be described below in greater detail with respect to the hypothetical two-aperture phased array telescope shown in FIG. 1. The major design goal is to provide optical phasing at all field angles. To this end, the so-called "golden rule of separated telescopes" requires that the array of exit pupils formed by the subtelescopes be an exact, demagnified replica of the entrance pupil array.

Mathematical expression of this requirement is provided below with reference to FIG. 1. These requirements are conventionally interpreted to require that subtelescope linear magnification be equal to subtelescope angular magnification and that, as compared to the entrance pupils, the subtelescope exit pupils may not be rotated relative to each other. The array of exit pupils, as a whole, may be rotated relative to the entrance pupils, but relative to each other, the exit pupils must have the same orientation as the entrance pupils. This relationship is described below in greater detail with respect to FIG. 2.

Further requirements of the subaperture array configuration are related to the overall resolution of a phased array telescope. This resolution is affected by the shape of the intensity distribution on the final image plane for an object in the field of view. The exit pupil array obtained from the subtelescopes are combined in the beam combining telescope at a final image plane which may include optical, photographic, or other appropriate sensors.

The resolution of a phased array telescope may be evaluated in terms of the shape of the intensity distribution on the final image plane obtained in the case of a hypothetical point object in the field of view of the phased array telescope. It is well known that the resultant intensity distribution, known as the point spread function or PSF, is proportional to the squared modulus of the Fourier transform of the entrance pupil. For a monolithic entrance pupil, the Fourier transform would be the zeroth order Bessel function of the first kind. The narrower the PSF, the higher the resolution of the optical system.

The resolution of an optical system may also be expressed in terms of the modulation transfer function, or MTF, of the optical system. The MTF is the Fourier transform of the PSF. This is the same as the autocorrelation of the entrance pupil. The MTF indicates the contrast to be expected in the image of an object having a specified spatial frequency.

The highest spatial frequency transmitted by an optical system, such as a phased array telescope, is called the cutoff frequency and is related to the entrance pupil diameter and the operating wavelength. The design requirements for phased array telescopes related to system aberrations, and the relationship between subaperture diameters and their separation, are quite complex and must be carefully followed to prevent areas of substantially degraded resolution at spatial frequencies below the cutoff frequency. Furthermore, the beam combining telescope must transmit the correct array of exit pupils to the first image plane without further obscuration. Thus, while the spaces between subapertures will cause degradation of resolution with respect to a monolithic telescope of the same effective aperture, the maximum phased array cutoff frequency is still potentially realizable in a properly configured phased array telescope.

The requirement that the linear and angular magnification of subtelescopes be equal is conventionally interpreted to require that these subtelescopes be free of the aberration known as distortion. In conventional optical design, freedom from distortion conventionally requires that the tangent of the output field angle be equal to the product of the tangent of the input field angle and the subtelescope magnification.

It has been proposed by certain investigators that, for phased array optical telescopes, optical phasing is assured if the sine of the output field angle is equal to the product of the sine of the input field angle and the subtelescope magnification. For small field angles, however, the conventional approximation used is that the sine of an angle is approximately the same as the tangent of that angle which is equal to that angle expressed in radians. Therefore, for phased array telescopes, optical phasing has been expected to require that for each subtelescope, the output field angle be equal to the product of the input field angle and the subtelescope magnification. See for example, W. A. Traub, "Combining beams from separated telescopes," Appl Opt. 25, 528 (1986).

Such design requirements and limitations of phased array telescopes have substantially retarded the development of these systems. Designs for several such phased array telescopes have been reported in the literature. But known phased array optical telescope designs do not provide simultaneous optical phasing over a wide field of view for operations over the full visible to infrared spectral range.

What is needed is a better understanding of the actual requirements for simultaneous optical phasing in phased array telescope designs and specific designs for such systems which actually provide simultaneous optical phasing over the full visible to infrared spectral range.

SUMMARY OF THE INVENTION

The preceding and other shortcomings of the prior art are addressed and overcome by the present invention that provides a phased array optical telescope which is simultaneously optically phased over a wide field of view on the order of 15 arcminutes. The present invention may be optically configured to provide all reflective surfaces, permitting operation over the entire visible to infrared spectral range.

In another aspect, the invention provides a phased array telescope substantially optically phased across its field of view, including a plurality of afocal subtelescopes having predetermined distortion, and beam combining telescope means for combining the output beams from the subtelescopes to form an image, whereby the predetermined subtelescope distortion improves the resulting by reducing piston error otherwise caused by distortion-free subtelescopes image.

In another aspect, the invention provides a method for configuring a phased array telescope to be substantially optically phased across its field of view, by providing predetermined distortion in a plurality of afocal subtelescopes, and combining the output beams from the subtelescopes to form an image, whereby the predetermined subtelescope distortion improves the resulting by reducing piston error otherwise caused by distortion-free subtelescopes image.

These and other features and advantages of this invention will become further apparent from the detailed description that follows which is accompanied by one or more drawing figures. In the figures and description, numerals indicate the various features of the invention, like numerals referring to like features throughout both the drawing figures and the description.

BRIEF DESCRIPTION OF THE DRAWING(S)

DETAILED DESCRIPTION OF THE PREFERRED EMBODIMENT(S)

Figure 1:
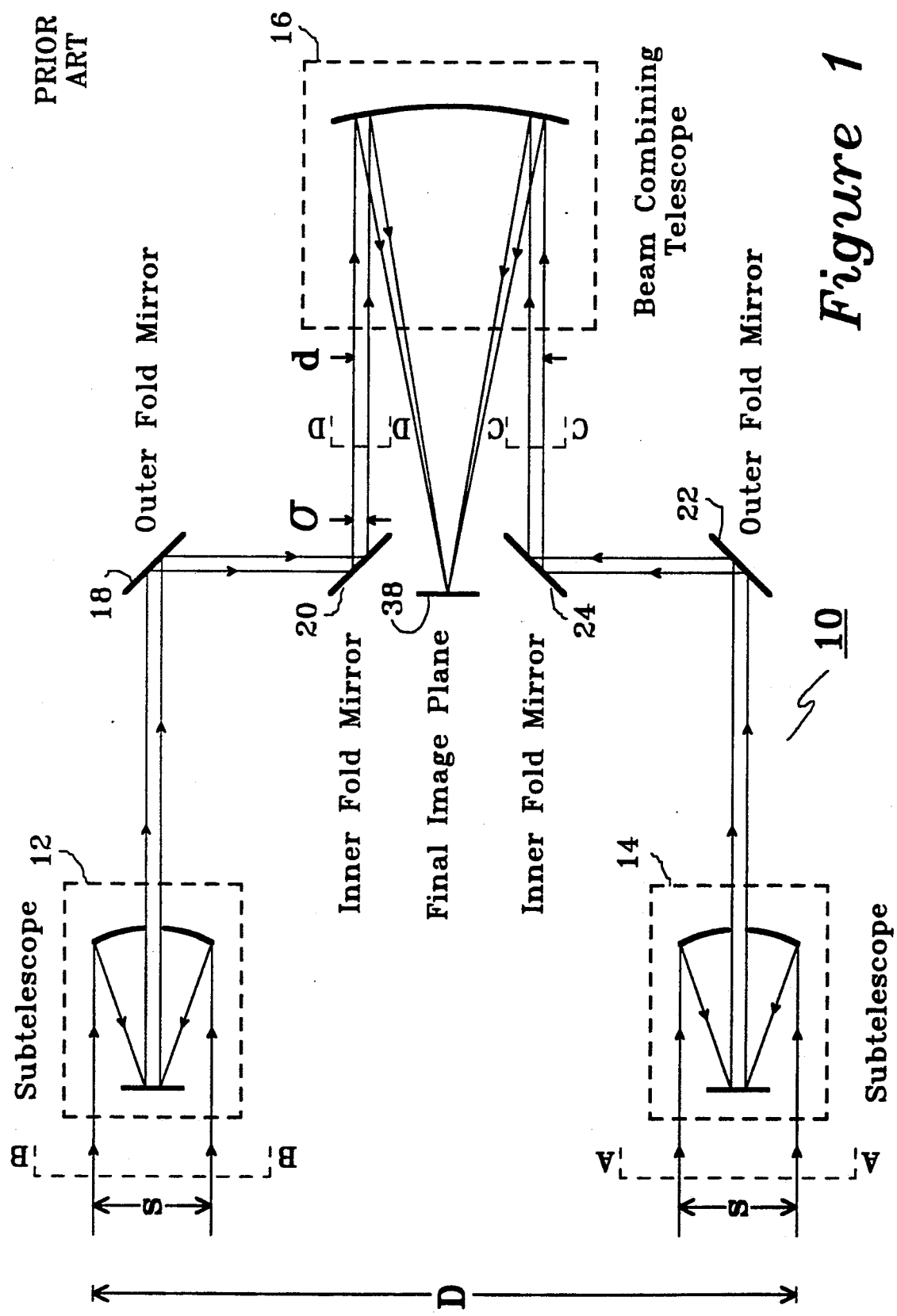
FIG. 1 is a simplified phased array telescope design, shown in a fictional two-aperture configuration, for the purpose of describing conventional design requirements and practice.

FIG. 1 is a simplified phased array telescope design, shown in a fictional two-aperture configuration, for the purpose of describing conventional design requirements and practice. In FIG. 1, phased array telescope 10 includes subtelescopes 12 and 14 coupled to beam combining telescope 16 by outer and inner fold mirror pairs 18 and 20, and 22 and 24, respectively. Although phased array telescope 10 is shown in a two aperture configuration for convenience, a three or four aperture configuration is more likely to be used as a practical minimum aperture configuration.

During operation of phased array telescope 10, a wavefront of diameter D enters from the left and is broken by subtelescopes 12 and 14 into subaperture wavefronts of diameter s. Subtelescopes 12 and 14 convert these subaperture wavefronts, known as the entrance pupil array, into output wavefronts of diameter $\sigma$. Outer and inner fold mirror pairs 18 and 20, and 22 and 24, convert the array of exiting subtelescope wavefronts, known as the exit pupil array, into an array of diameter d applied to beam combining telescope 16.

As noted herein above, the golden rule of separated telescopes requires that the array of exit pupils be an exact, demagnified replica of the entrance pupil array. A mathematical expression of this requirement, based on the configuration of phased array telescope 10 may be presented as follows:

$$d = D/m_c$$
$$\sigma = s/m_c \tag{1}$$

where $m_c$ is the subtelescope linear magnification, that is, the ratio of input to output marginal ray heights, D is the overall or global array diameter, d is the entrance pupil diameter of beam combining telescope 16, s is the entrance pupil diameter of subtelescopes 12 and 14 and $\sigma$ is the output beam diameter of subtelescopes 12 and 24.

The golden rule of separated telescopes also implies that the Lagrange invariant, H, must be satisfied by the configuration of phased array telescope 10, as follows:

$$0H = \gamma D/2 = (\gamma m_l)d/2, \tag{2}$$

where $\gamma$ is the tangent of the object field angle and $m_l$ is the angular magnification of subtelescopes 12 and 14. Equations (1) and (2) above, when combined, imply that the following condition must hold:

$$m_c = m_l. \tag{3}$$

The requirement of equation (3) is conventionally understood to require that the linear magnification of the subtelescopes equal their angular magnification and that each such subtelescope be free of the aberration known as distortion.

The requirements on the lateral pupil geometry also indicate that, as compared to the entrance pupils, the exit pupils of subtelescopes 12 and 14 must not be rotated relative to each other. The array of exit pupils, as a whole, may be rotated relative to the entrance pupils, but relative to each other, the exit pupils must have the same orientation as the entrance pupils.

These relationships may be described for convenience with respect to FIGS. 2(a-d). FIG. 2a shows a representation of entrance pupils 26 and 28 of subtelescopes 12 and 14, taken along lines AA and BB in FIG. 1, respectively. The field of view of subtelescope 12 includes stick FIG. 30 while the field of view of subtelescope 14 includes stick FIG. 32. The field of view of phased array telescope 10 therefore includes a pair of stick figures, 30 and 32, side by side and both oriented in the same direction.

Figure 2A:
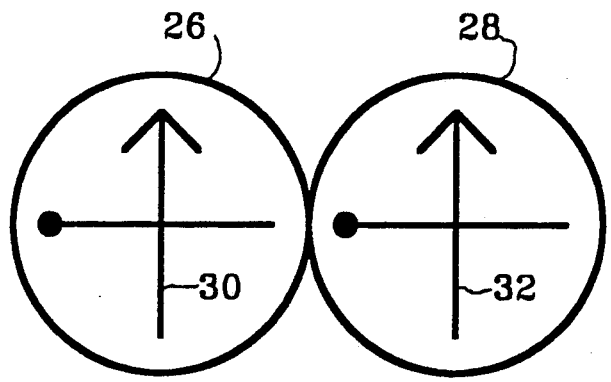
FIG. 2(a-d) is a series of views representing the entrance and exit pupil fields of view of subtelescope 12 illustrating the permeable and impermissible rotations of the exit pupil views.
Figure 2B:
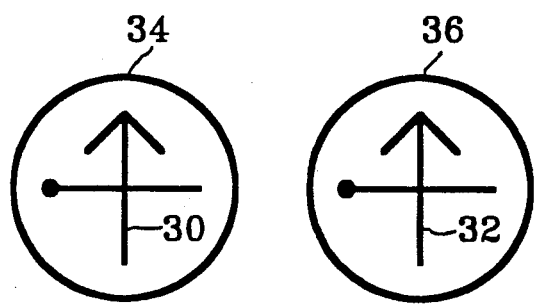

FIG. 2b shows a representation of exit pupils 34 and 36 of subtelescopes 12 and 14, taken along lines CC and DD in FIG. 1, respectively. Stick FIGS. 30 and 32 have not been rotated by the optical configuration of phased array telescope 10 which is therefore in accordance with the above described requirement of lateral pupil geometry for exit pupil orientation.

Figure 2C:
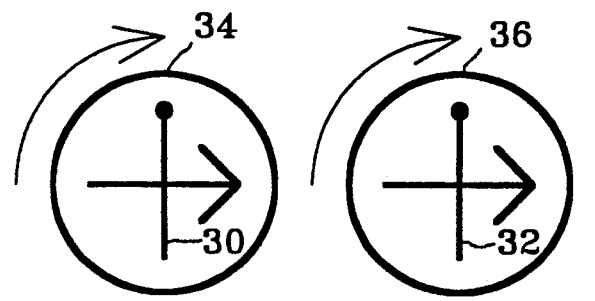

FIG. 2c shows a different representation of exit pupils 34 and 36, similar to that shown in FIG. 2b, except that stick FIGS. 30 and 32 have been rotated with respect to each other by the optical configuration of some other phased array telescope configuration, not shown. The configuration of a phased array telescope which results in the relative rotation of the exit pupils as shown in FIG. 2c would not be in accordance with the above described requirement of lateral pupil geometry for exit pupil orientation and would therefore not function properly.

Figure 2D:
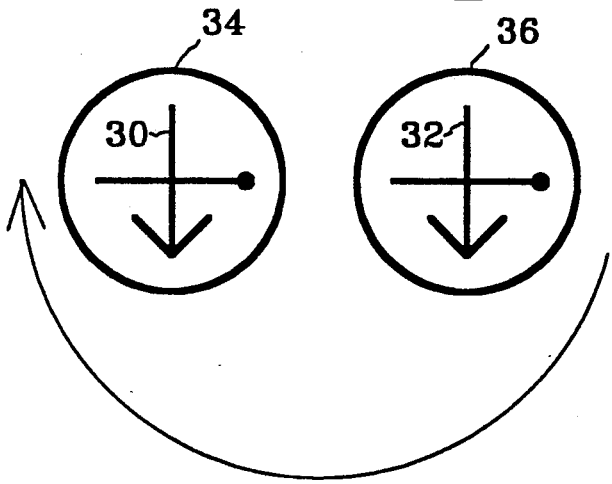

FIG. 2d shows a still further representation of exit pupils 34 and 36 in which stick FIGS. 30 and 32 have not been rotated with respect to each other, but have both been rotated as a group with respect to entrance pupils 26 and 28 by the optical configuration of some other phased array telescope configuration, not shown. The configuration of a phased array telescope which would result in the group rotation of the exit pupils shown in FIG. 2d would be in accordance with the above described requirement of lateral pupil geometry for exit pupil orientation and would therefore function properly.

As noted above with respect to equation (3), it is generally understood that in a phased array telescope, the linear magnification of the subtelescopes must equal their angular magnification. This requirement has conventionally been understood to mean that each such subtelescope be free of the aberration known as distortion. In conventional optical design principles, freedom from distortion is usually understood to require that the tangent of the output field angle $\gamma'$ is equal to the product of the tangent of the input field angle $\gamma$ and the subtelescope magnification, as follows:

$$\gamma = \tan^{-1}(m_c \tan \gamma). \tag{4}$$

However, as noted above, it has been determined that in phased array telescopes, optical phasing is assured if the telescopes conform to the following condition:

$$' = \sin^{-1}(m_c \sin \gamma). \tag{5}$$

The operation of the arcsin rule shown in equation (5) is conventionally understood to be satisfied by application of the arctan rule shown in equation (4) because the tangent of a small angle is generally approximated to be equal to the angle itself, expressed in radians.

In accordance with the present invention, however, it is recognized that use of the small angle approximation in the design of phased array telescope limits the resolution of the telescope even though it seems to satisfy the generally accepted criterion that each subtelescope be free of the aberration called distortion. In the present invention, the arcsin rule given in equation (5) is followed precisely even though this results in the imposition of a small amount of distortion in each subtelescope, contrary to the generally accepted optical design rule that requires freedom from distortion in each subtelescope. The magnitude of the distortion in each subtelescope is carefully controlled so that the path lengths for all similar rays, on-axis as well as off-axis rays, are exactly equal.

Figure 3:
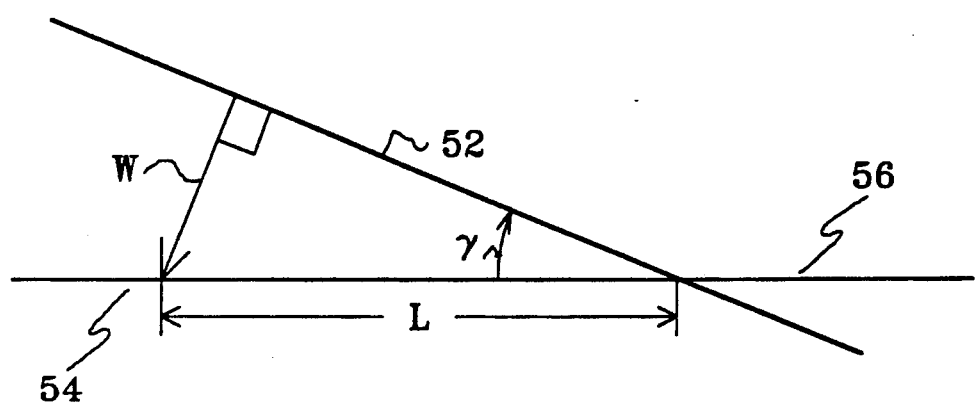
FIG. 3 is a sketch of an exemplary wavefront entering a subtelescope in a phased array telescope.

FIG. 3 is a sketch of wavefront 52 entering the phased array telescope at a field angle of 7. Optical path length difference W, between portions of wavefront 52 entering the subtelescope apertures, must be measured perpendicularly to the wavefront, as shown. Distance L is the separation between the optical axes of subtelescope 54 and subtelescope 56. Optical path length difference W is related to field angle $\gamma$ as a sine function, as follows:

$$W = L \sin \gamma \tag{6}$$

Figure 4:
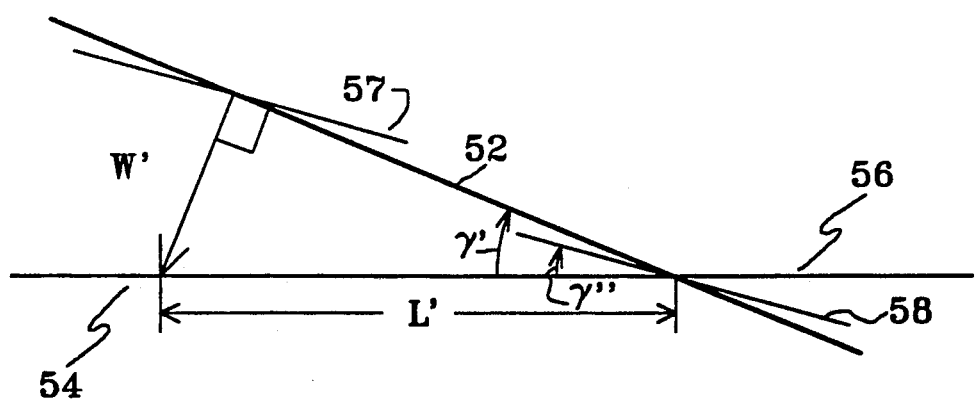
FIG. 4 is a sketch of the wavefront shown in FIG. 3 from the subtelescope.

FIG. 4 is a sketch of wavefront 52 shown in FIG. 3 emerging from the phased array telescope in accordance with the present invention. This wavefront has been separated by the subtelescopes into the wavefront segments 57 and 58. Wavefront 52, shown in FIG. 4, does not actually exist in a phased array telescope. Only wavefront segments 57 and 58 exist. However, in a properly designed phased array telescope, segments 57 and 58 lie in the plane designated by wavefront 52 in FIG. 4. As discussed by Traub, optical path length difference W', between portions of the wavefront leaving subtelescopes 54 and 56, must equal path length difference W between portions of the wavefront entering subtelescopes 54 and 56, shown in FIG. 3 of the entering wavefront, in order to satisfy the path length requirements noted above for optical phasing across the field of view for phased array telescopes. This will be the case if the field angle $\gamma'$ of emerging wavefront 52 is given by:

$$\gamma' = sin^{-1}(m_c sin\gamma) \qquad (7)$$

where linear magnification $m_c$ of the subtelescopes is equal to distance L, shown in FIG. 3, divided by distance L', shown in FIG. 4. In any phased array telescope which is configured according to the golden rule mentioned above, the centers of wavefront segments 57 and 58 will lie in plane 52, whose angle relative to an on-axis wavefront is given by equation (7). However, the wavefront segments 57 and 58 emerging from subtelescopes relying directly on the arctan rule shown in equation (4) above are tilted at angle $\gamma''$ given by:

$$\gamma'' = tan^{-1}(m_c tan\gamma). \qquad (8)$$

As shown in FIG. 4, $\gamma''$ is smaller than $\gamma'$, and therefore a piston error occurs between wavefront segments 57 and 58. When these wavefront segments are combined by the beam combiner, this piston error will cause a deterioration of the phased array telescope image such that the proper resolution will no longer be achieved. Therefore, the wavefront segments 57 and 58 must be given an extra tilt by the subtelescopes, such that they emerge with angle $\gamma'$. This extra tilt amounts to the introduction of distortion into the subtelescope by means of the appropriate optical design procedures. Improved phased array telescope resolution results if the subtelescopes are given arcsine-rule distortion.

Figure 5:
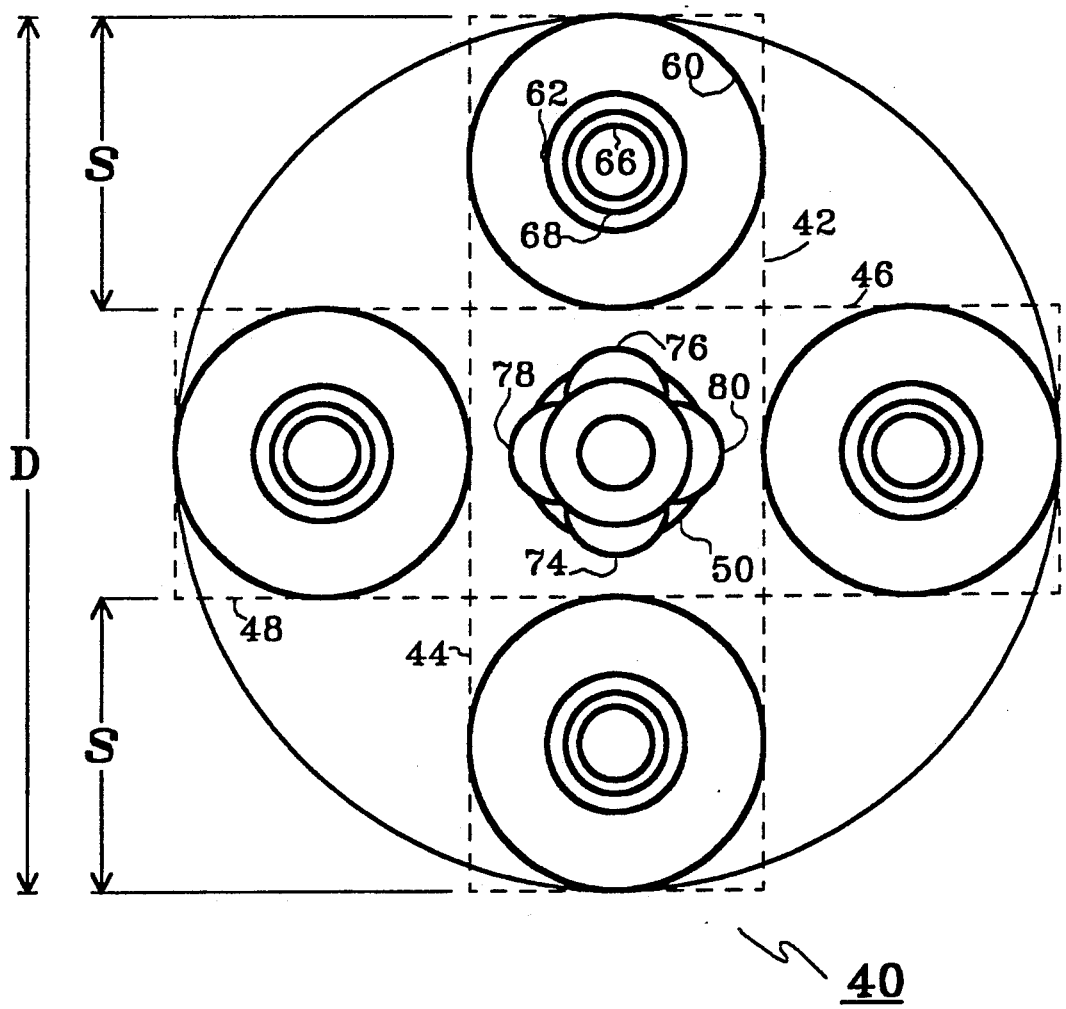
FIG. 5 is a front elevation view of the optic plan of a phased array telescope according to the present invention.
Figure 6:
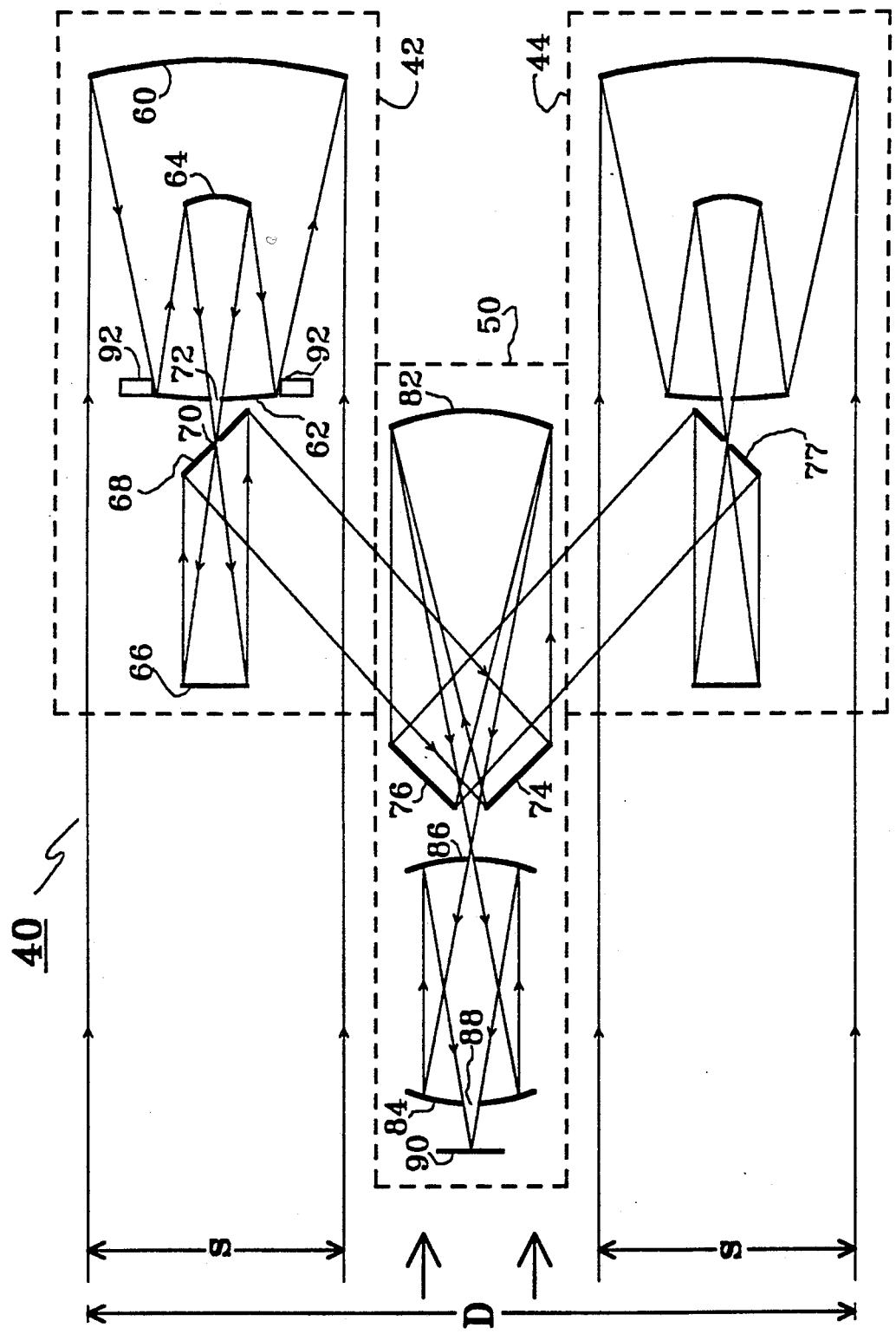
FIG. 6 is a side view of the optic plan of phased array telescope shown in FIG. 5.

The introduction of the proper distortion in the subtelescopes requires some care, especially in the design of phased array operable over a wide spectral range. The present invention achieves wide spectral range by using only reflective optical surfaces, such as mirrors. One embodiment of the present invention will now be described in detail with regard to FIGS. 5 and 6. FIG. 5 is a front elevation view of the optic plan of phased array telescope 40 according to the present invention. FIG. 6 is a side view of the same optic plan of phased array telescope 40. The following description may best be understood with reference to both figures.

The primary optics of phased array telescope 42 include subtelescopes 42, 44, 46, and 48 and beam combining telescope 50. Subtelescopes 46 and 48 are not shown in FIG. 6 for clarity. The optics and operation of subtelescope 42 will first be described in detail. The optics of subtelescopes 44, 46, and 48 are substantially the same as that of subtelescope 42 and do not require separate explanation. The optics and operation of beam combining telescope 50 will then be described in detail.

Subtelescope 42 is a four mirror telescope, including primary mirror 60, secondary mirror 62, aspheric fold mirror 64, and tertiary mirror 66. Primary, secondary, and tertiary mirrors 60, 62, and 66 have optical power selected so that field curvature is eliminated. In addition, these mirrors contain additional aspheric surface departures in order to correct wavefront aberrations.

Aspheric fold mirror 64 is, however, not powered but contains aspheric surface departures of the fourth and sixth order, in terms of aperture radius. Aspheric fold mirror 64 provides an added degree of freedom for controlling distortion because it is not powered. As noted above, in phased array telescope 40 according to the present invention, the design goal is not to eliminate distortion in each subtelescope, but rather to control the distortion so that each such subtelescope follows the arcsin rule which results in a distortion which aids combining by reducing piston error.

Primary mirror 60 and secondary mirror 62 are similar to a Cassegrain telescope and form an image after aspheric fold mirror 64. Tertiary mirror 66 recollimates this intermediate image. If aspheric fold mirror 64 were flat and had no aspheric surface departures, the aspheric departures of primary mirror 60 and secondary mirror 62 would be those of a Cassegrain telescope and tertiary mirror 66 would be paraboloidal in shape. In accordance with conventional optical design principles, this combination may be designed to automatically correct for spherical, coma, and astigmatism aberrations, while the correct choice of optical powers removes field curvature.

Introduction of additional aspheric departures on aspheric fold mirror 64, in order to precisely control the distortion of subtelescope 42, forces the aspheric departures of the other three reflecting surfaces, i.e. primary, secondary and tertiary mirrors 60, 62, and 66, to be adjusted to preserve the correction wavefront aberrations. The correction of field curvature is not affected by these aspheric changes.

Outer fold mirror 65 is positioned between secondary mirror 62 and tertiary mirror 66. Opening 70 in outer fold mirror 68 and opening 72 in secondary mirror 62 permit the rays reflected from aspheric fold mirror 64 to reach tertiary mirror 66. These openings may be configured so that the obstruction introduced by opening 70 into the light beam is not greater than that caused by secondary mirror 62. Outer fold mirror 68 sends the demagnified, collimated beam to inner fold mirror 74 in beam combining telescope 50.

The operation of subtelescope 44 is substantially the same as that of subtelescope 42 except that outer fold mirror 77 sends the demagnified, collimated beam from subtelescope 44 to inner fold mirror 76 in beam combining telescope 50. The operation of subtelescopes 46 and 48 are substantially the same as that of subtelescopes 42 and 44, except that the beams from each of these subtelescopes are applied to inner fold mirrors 78 and 80 of beam combining telescope 50, respectively.

Beam combining telescope 50 may be thought of as a modified Mersenne-Wright system. Primary mirror 82 and secondary mirror 84 together form a Gregorian-Mersenne system with a magnification having an absolute value slightly greater than one. A relayed pupil is located on secondary mirror 84. Tertiary mirror 86 has a focal length approximately equal to its distance from this pupil and has the shape of an oblate spheroid. Tertiary mirror 86 may therefore be said to resemble a Wright mirror. The beam is applied by tertiary mirror 86 through opening 88 in secondary mirror 84 to final image plane 90. This configuration of beam combining telescope 50 permits diffraction limited image quality without causing beam obscuration beyond that caused by subtelescopes 42, 44, 46, and 48 and does not require the use of additional folding flat mirrors.

System stop 92 is positioned at the secondary mirror in each subtelescope 42, 44, 46, and 48, such as secondary mirror 62 of subtelescope 42. This reduces the obscuration caused by these subtelescope secondary mirrors and results in a longer exit pupil distance. Thus the exit pupil emerging from outer fold mirror 68 of subtelescope 42 is, for example, closer to beam combining telescopes 50 which permits a simpler design for beam combining telescope 50 and permits inner fold mirrors 74, 76, 78, and 80 to be smaller in diameter than would otherwise be required.

The preferred embodiment of phased array telescope 40 shown in FIGS. 5 and 6 may have a full field of view in the range of 15 arcminutes, or 0.25°, and an overall diameter, or effective aperture D, of about 10 meters. Because only reflective optical elements are used in phased array telescope 40, it will operate from the visible through the infrared portions of the spectrum, from about 0.5 $\mu$m to about 12 $\mu$m.

The overall diameter of phased array telescope 40 is about 10 meters while the diameter s of each subtelescope 42, 44, 46 and 48 is only 3.5 meters. Beam combining telescope 50 has a focal length of 4.8 meters and an entrance pupil diameter d of 1.2 meters. The magnification mc of subtelescopes 42, 44, 46, and 48 is $-8.33$, where the minus sign indicates that the beam emerging from the group of subtelescopes has been rotated 180° relative to the incoming beam.

In addition, phased array telescope 42 is calculated to have an effective focal ratio of f/4 with an effective focal length of 40 meters. The dilution ratio is calculated to be 1.3. The cutoff frequency will be in the range of about 410 to 520 cycles per millimeter or 80 to 100 cycles per arcsecond. The Strehl ratio is 0.99 times full field and the output field angles of subtelescopes 42, 44, 46, and 48 are about 1.04172°. These field angles conform with equation (5) above and thus phased array telescope 40 is optically phased throughout its field of view.

Additional detailed dimensions are provided in Tables 1 and 2 which detail various array specifications using standard optical sign conventions. Thus, mirrors whose focal points lie to the left of their surfaces are given negative radii, and viceversa. The refractive index after a mirror changes sign relative to the index before the mirror. Separations are given as negative in those spaces in which the index is negative, and viceversa.

The conic constraints are, as is standard in optical design practice, the negative square of the eccentricity of the surface. Thus, a conic constraint of $-1$ refers to a parabolic surface, anything less than $-1$ is hyperboloidal, anything between 0 and $-1$ is ellipsoidal, that is, prolate spheroidal, and anything greater than 0 is an oblate spheroid. Higher order aspheric coefficients give, when multiplied by the surface radius raised to the power of the coefficient, the aspheric departure from the base conic surface. The sign of this coefficient is relative to the local z-axis of the surface.

The effective focal lengths shown in Tables 1 and 2 are half of the mirror radii of curvature, and are signed such that mirrors which are concave to the incoming light are given positive focal lengths, and vice-versa. The sum of the powers, that is the reciprocals of focal lengths, of subtelescopes 42, 44, 46, and 48 are zero, thus confirming that such subtelescopes are free from field curvature. Beam combining telescope 50 has substantial field curvature, but this has no effect on the optical phasing.

TABLE 1

| | | Array Specifications | | | |
|---|---|---|---|---|---|
| Surface | Power ($mm^{-1}$) | Radius of Curvature (mm) | Separation (mm) | Conic Constant | Comments |
| 60 | 0.0001905 | $-10,500.00$ | $-3,914.08$ | $-1.1132$ | primary |
| 62 | $-.0005697$ | $-3,510.56$ | 2,645.00 | $-3.7907$ | secondary |
| 64 | 0 | $\infty$ | $-5,583.45$ | 0.55E-11 (4th Order) | Asph. fold |
| 66 | 0.0003792 | 5,273.80 | 2,636.90 | 0.0558 | tertiary |
| 68 | 0 | $\infty$ | $-4,201.11$ | 0 | outer fold |
| 74 | 0 | $\infty$ | 3,829.66 | 0 | inner fold |
| 82 | 0.0002513 | $-7,959.31$ | $-9,963.63$ | $-1.8766$ | BCT primary |
| 88 | 0.0001807 | 11,067.30 | 5,803.57 | $-2.3903$ | secondary |
| 86 | 0.0001357 | $-14,742.73$ | $-6,647.83$ | 5.5125 | tertiary |
| 90 | | $-1,776.73$ | | | image plane |

TABLE 2

| | Array Specifications Continued | | | | | | |
|---|---|---|---|---|---|---|---|
| | 6th Order | 8th Order | | Clear Aperture | | Obscuration | |
| Surface | Aspheric ($mm^{-5}$) | Aspheric ($mm^{-7}$) | Tilt Angle | X (mm) | Y (mm) | X (mm) | Y (mm) |
| 60 | 0. | 0 | 0° | 3,600 | 3,600 | | |
| 62 | 0.38E-19 | 0 | 0° | 910 | 910 | 164 | 164 |
| 64 | $-0.1307$E-17 | 0 | 0° | 530 | 530 | | |
| 66 | $-0.1105$E-18 | 0 | 0° | 600 | 600 | | |
| 68 | 0 | 0 | 30° | 510 | 510 | 120 | 144 |
| 74 | 0 | 0 | 30° | 534 | 616 | | |
| 82 | $-0.2940$E-20 | $-0.1123$E-26 | 0° | 1,500 | 1,500 | | |
| 88 | $-0.4850$E-20 | 0 | 0° | 1,840 | 1,840 | 390 | 390 |
| 86 | 0.5243E-20 | 0.1284E-27 | | 1,840 | 1,840 | 220 | 220 |
| 90 | | | | | | 200 | 200 |

While this invention has been described with reference to its presently preferred embodiments, its scope is not limited thereto. Rather, such scope is only limited in so far as defined by the following set of claims and includes all equivalents thereof.

What is claimed is:

1. A phased array telescope substantially optically phased across its field of view, comprising:
   a plurality of afocal subtelescopes having predetermined distortion; and
   beam combining telescope means for combining the output beams from the subtelescopes to form an image, whereby the predetermined subtelescope distortion improves the resulting image by reducing piston error otherwise caused by distortion-free subtelescopes.

2. The phased array telescope claimed in claim 1, wherein the distortion in each subtelescope is substantially the same.

3. The phased array telescope claimed in claim 1, wherein input and output field angles are associated with each subtelescopes and the distortion in each subtelescope causes the sine of the subtelescope output field angle to be a constant function of the sine of the subtelescope input field angle.

4. The phased array telescope claimed in claim 1, wherein magnification and input and output field angles are associated with each subtelescope and the distortion in each subtelescope causes the sine of the subtelescope output field angle to be equal to the product of the subtelescope magnification and the sine of the subtelescope input field angle.

5. The phased array telescope claimed in claim 1, wherein each subtelescope and the beam combining means include optical components, and all such optical components are reflecting surfaces.

6. The phased array telescope claimed in claim 5, wherein magnification, distortion and input and output field angles are associated with each such subtelescope and the distortion in each subtelescope causes the sine of the subtelescope output field angle to be equal to the product of the subtelescope magnification and the sine of the subtelescope input field angle.

7. The phased array telescope claimed in claim 6, wherein each subtelescope further comprises:
   optically powered primary reflecting means for collecting input light beams;
   optically powered secondary reflecting means for forming an image of the input light beams;
   aspheric unpowered reflecting means responsive to the secondary reflecting means for altering the direction of the beam therefrom before said image would be formed; optically powered tertiary reflecting means responsive to the aspheric unpowered reflecting means for collimating the beam therefrom; and means responsive to the beam from the optically powered tertiary reflecting means for applying the beam therefrom to the beam combining means.

8. A method for configuring a phased array telescope to be substantially optically phased across its field of view, comprising the steps of:
   providing predetermined distortion in a plurality of afocal subtelescopes; and
   combining the output beams from the subtelescopes to form an image, whereby the predetermined subtelescopes distortion reduces piston error otherwise caused by distortion-free subtelescopes.

9. The method claimed in claim 8, wherein the subtelescopes distortion step further comprises:
   providing substantially the same distortion in each subtelescopes.

10. The method claimed in claim 8, wherein input and output field angles are associated with each subtelescope and the subtelescope distortion step further comprises:
    causes the sine of the subtelescope output field angle to be a constant function of the sine of the subtelescope input field angle.

11. The method claimed in claim 8, wherein magnification and input and output field angles are associated with each subtelescope and the distortion in each subtelescope causes the sine of the subtelescope output field angle to be equal to the product of the subtelescope magnification and the sine of the subtelescope input field angle.

12. The method claimed in claim 8, wherein the phased array telescope is configured so that optical beam paths therein include only reflecting surfaces.

13. The method claimed in claim 12, wherein distortion, input and output field angels are associated with each subtelescope and the distortion in each subtelescope causes the sine of the subtelescope output field angle to be equal to the product of the subtelescope magnification and the sine of the subtelescope input field angle.

14. The method claimed in claim 8, wherein the subtelescope distortion step further comprises:
    first reflecting the input light beams with a powered primary reflecting surface;
    then reflecting the light beam with an optically powered secondary surface configured to form an image of the input light beams;
    then reflecting the light beams with an aspheric unpowered reflecting surface to alter the direction of the beam therefrom before said image would be formed;
    then collimating the beam with an optically powered tertiary reflecting surface; and
    then applying the beam for combining.

* * * * *

UNITED STATES PATENT AND TRADEMARK OFFICE
CERTIFICATE OF CORRECTION

PATENT NO. : 5,113,284
DATED : May 12, 1992
INVENTOR(S) : Tilman W. Stuhlinger

It is certified that error appears in the above-indentified patent and that said Letters Patent is hereby corrected as shown below:

```
Col. 1, line 64, replace --sequence-- with "segments".
Col. 3, line 1, replace --autooorre- -- with "autocorre-.
Col. 4, line 34, replace --permeable-- with "permissible";
        line 39, before --from-- insert "emerging".
Col. 5, line 17, replace --24-- with "14";
        line 22, replace --OH-- with "H".
Col. 6, line 27, replace --γ-- with "γ'";
        line 33, replace --'-- with "γ'";
        line 56, replace --7-- with " γ".
Col. 7, line 20, delete --linear--;
        line 57, replace --42-- with "40".
Col. 9, line 33, replace --42-- with "40".
```

Signed and Sealed this

Twenty-eighth Day of September, 1993

Attest:

BRUCE LEHMAN

Attesting Officer

Commissioner of Patents and Trademarks